(12) United States Patent
Dharne et al.

(10) Patent No.: US 11,293,260 B2
(45) Date of Patent: Apr. 5, 2022

(54) BUOYANCY ASSIST TOOL

(71) Applicant: HALLIBURTON ENERGY SERVICES, INC., Houston, TX (US)

(72) Inventors: Avinash Gopal Dharne, Houston, TX (US); Stephen Allen Yeldell, Golden, CO (US); Frank Vinicio Acosta, Spring, TX (US); Min Mark Yuan, Katy, TX (US); Kevin Wendell Ardoin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 257 days.

(21) Appl. No.: 16/605,644

(22) PCT Filed: Dec. 20, 2018

(86) PCT No.: PCT/US2018/066889
§ 371 (c)(1),
(2) Date: Oct. 16, 2019

(87) PCT Pub. No.: WO2020/131076
PCT Pub. Date: Jun. 25, 2020

(65) Prior Publication Data
US 2021/0332667 A1 Oct. 28, 2021

(51) Int. Cl.
*E21B 34/06* (2006.01)
*E21B 33/129* (2006.01)
*F16K 17/16* (2006.01)

(52) U.S. Cl.
CPC ........ *E21B 34/063* (2013.01); *E21B 33/1294* (2013.01); *E21B 2200/06* (2020.05); *F16K 17/16* (2013.01)

(58) Field of Classification Search
CPC ............... E21B 34/063; E21B 33/1294; E21B 2200/06; F16K 17/16
See application file for complete search history.

(56) References Cited

U.S. PATENT DOCUMENTS 3,463,351 A    8/1969  Mills
3,779,263 A *  12/1973 Edwards ............... E21B 34/063
                                                137/68.25

(Continued)

FOREIGN PATENT DOCUMENTS

EP    0566290 A1   10/1993
EP    0681087 B1    9/2000

(Continued)

OTHER PUBLICATIONS

International Search Report and Written Opinion dated Oct. 27, 2020, issued in PCT Application No. PCT/US2020/039399.

(Continued)

*Primary Examiner* — Steven A MacDonald
(74) *Attorney, Agent, or Firm* — McAfee & Taft (57) ABSTRACT

A buoyancy assist tool has an outer case and a rupture disk connected in the outer case. A sleeve is disposed in the outer case and movable from first to second position in the outer case. A rupture disk membrane of a rupture disk prevents the sleeve from moving to the second position prior to the rupture disk membrane rupturing. The outer case is configured to be connected in a well casing. A lock ring holds the sleeve in the first position.

15 Claims, 7 Drawing Sheets

(56) References Cited

U.S. PATENT DOCUMENTS

| | | | |
|---|---|---|---|
| 3,980,134 A | 9/1976 | Amancharla | |
| 4,457,376 A * | 7/1984 | Carmody | E21B 34/10 |
| | | | 166/332.8 |
| 5,150,756 A | 9/1992 | Hassanzadeh | |
| 5,479,986 A | 1/1996 | Gano et al. | |
| 5,526,846 A * | 6/1996 | Maloberti | E21B 17/017 |
| | | | 138/109 |
| 5,765,641 A | 6/1998 | Shy et al. | |
| 5,826,661 A | 10/1998 | Parker et al. | |
| 6,026,903 A | 2/2000 | Shy et al. | |
| 6,076,600 A | 6/2000 | Vick, Jr. et al. | |
| 6,161,622 A | 12/2000 | Robb et al. | |
| 6,324,904 B1 | 12/2001 | Ishikawa et al. | |
| 6,450,263 B1 | 9/2002 | Schwendemann | |
| 6,505,685 B1 | 1/2003 | Sullaway et al. | |
| 6,622,798 B1 | 9/2003 | Rogers et al. | |
| 6,651,748 B2 | 11/2003 | Sullaway et al. | |
| 6,672,389 B1 * | 1/2004 | Hinrichs | E21B 47/117 |
| | | | 166/317 |
| 6,758,281 B2 | 7/2004 | Sullaway et al. | |
| 7,270,191 B2 | 9/2007 | Drummond et al. | |
| 8,505,621 B2 | 8/2013 | Telfer et al. | |
| 9,033,055 B2 | 5/2015 | Mccoy et al. | |
| 9,309,752 B2 | 4/2016 | Talley et al. | |
| 9,441,437 B2 | 9/2016 | Fripp et al. | |
| 9,441,446 B2 | 9/2016 | Fripp et al. | |
| 9,518,445 B2 * | 12/2016 | Noske | E21B 21/103 |
| 9,540,904 B2 | 1/2017 | Petrowsky | |
| 9,593,542 B2 * | 3/2017 | Getzlaf | E21B 33/146 |
| 10,138,707 B2 | 11/2018 | Tolman et al. | |
| 10,323,478 B2 * | 6/2019 | Berscheidt | E21B 33/1293 |
| 10,767,446 B2 * | 9/2020 | Shimmoto | E21B 34/12 |
| 10,883,314 B2 * | 1/2021 | Getzlaf | E21B 21/10 |
| 10,989,013 B1 * | 4/2021 | Helms | E21B 33/126 |
| 2002/0185273 A1 | 12/2002 | Aronstam et al. | |
| 2003/0116324 A1 | 6/2003 | Dawson et al. | |
| 2003/0217844 A1 | 11/2003 | Moyes | |
| 2008/0073075 A1 | 3/2008 | Buyers et al. | |
| 2008/0115942 A1 | 5/2008 | Keller et al. | |
| 2009/0205818 A1 * | 8/2009 | Klunge | E21B 33/1208 |
| | | | 166/179 |
| 2010/0270031 A1 | 10/2010 | Patel | |
| 2010/0294376 A1 * | 11/2010 | O'Brien | F16K 1/2007 |
| | | | 137/12 |
| 2011/0042099 A1 | 2/2011 | Williamson, Jr. et al. | |
| 2011/0253392 A1 | 10/2011 | May et al. | |
| 2012/0111566 A1 | 5/2012 | Sherman et al. | |
| 2014/0174757 A1 | 6/2014 | Fripp et al. | |
| 2014/0216756 A1 * | 8/2014 | Getzlaf | E21B 33/146 |
| | | | 166/376 |
| 2014/0224505 A1 | 8/2014 | Ramon | |
| 2014/0338923 A1 | 11/2014 | Fripp et al. | |
| 2015/0107843 A1 | 4/2015 | Talley et al. | |
| 2015/0129205 A1 | 5/2015 | Hofman et al. | |
| 2015/0240596 A1 * | 8/2015 | Horwell | E21B 34/16 |
| | | | 166/332.8 |
| 2015/0252650 A1 * | 9/2015 | Gaspard | E21B 34/06 |
| | | | 166/285 |
| 2016/0177668 A1 * | 6/2016 | Watson | E21B 21/10 |
| | | | 166/373 |
| 2016/0333658 A1 | 11/2016 | Keshishian et al. | |
| 2017/0096875 A1 | 4/2017 | Ravensbergen et al. | |
| 2017/0138153 A1 * | 5/2017 | Getzlaf | E21B 21/10 |
| 2018/0003004 A1 | 1/2018 | Norman et al. | |
| 2018/0058179 A1 | 3/2018 | Nuryaningsih et al. | |
| 2018/0080308 A1 * | 3/2018 | Dedman | E21B 43/10 |
| 2018/0209245 A1 * | 7/2018 | Shimmoto | E21B 34/12 |
| 2018/0219200 A1 | 8/2018 | Albukrek et al. | |
| 2018/0262127 A1 | 9/2018 | Gooneratne et al. | |
| 2018/0371869 A1 | 12/2018 | Kellner et al. | |
| 2019/0128081 A1 | 5/2019 | Ross et al. | |
| 2019/0352994 A1 | 11/2019 | Giroux | |
| 2019/0352995 A1 | 11/2019 | Giroux et al. | |
| 2020/0284121 A1 * | 9/2020 | Helms | E21B 17/00 |
| 2021/0062598 A1 * | 3/2021 | Yuan | E21B 23/065 |
| 2021/0123317 A1 * | 4/2021 | Yuan | E21B 29/02 |
| 2021/0131222 A1 * | 5/2021 | Helms | E21B 33/1208 |

FOREIGN PATENT DOCUMENTS

| | | |
|---|---|---|
| JP | 6551001 B2 | 7/2019 |
| WO | 2014098903 A1 | 6/2014 |
| WO | 2015073001 A1 | 5/2015 |
| WO | 2016176643 A1 | 11/2016 |
| WO | 2019099046 A1 | 5/2019 |

OTHER PUBLICATIONS

International Search Report and Written Opinion dated Feb. 24, 2021, issued in PCT Application No. PCT/US2020/040157.

International Search Report and Written Opinion dated Sep. 19, 2019, issued in corresponding PCT Application No. PCT/US2018/066889.

International Search Report and Written Opinion dated Aug. 14, 2018, issued in PCT Application No. PCT/US2017/062528.

International Search Report and Written Opinion dated Sep. 19, 2019, issued in PCT Application No. PCT/US2018/067161.

International Search Report and Written Opinion dated Aug. 23, 2019, issued in PCT Application No. PCT/US2018/064085.

International Search Report and Written Opinion dated Aug. 14, 2019, issued in PCT Application No. PCT/US2018/064051.

International Search Report and Written Opinion dated Jan. 14, 2020, issued in PCT Application No. PCT/US2019/027502.

International Search Report and Written Opinion dated Feb. 5, 2020, issued in PCT Application No. PCT/US2019/031541.

International Search Report and Written Opinion dated Jan. 16, 2020, issued in PCT Application No. PCT/US2019/027625.

International Search Report and Written Opinion dated Jan. 21, 2020, issued in PCT Application No. PCT/US2019/028508.

International Search Report and Written Opinion dated May 25, 2020, issued in PCT Application No. PCT/US2019/056206.

International Search Report and Written Opinion dated May 26, 2020, issued in PCT Application No. PCT/US2019/059757.

International Search Report and Written Opinion dated Jul. 21, 2020, issued in PCT Application No. PCT/US2019/059864.

International Search Report and Written Opinion dated Jul. 23, 2020, issued in PCT Application No. PCT/US2019/061714.

International Search Report and Written Opinion dated Aug. 11, 2020, issued in PCT Application No. PCT/US2019/065862.

International Search Report and Written Opinion dated Aug. 31, 2020, issued in PCT Application No. PCT/US2020/012307.

* cited by examiner

BUOYANCY ASSIST TOOL

The length of deviated or horizontal sections in well bores is such that it is sometimes difficult to run well casing to the desired depth due to high casing drag. Long lengths of casing create significant friction and thus problems in getting casing to the toe of the well bore. Creating a buoyant chamber in the casing utilizing air or a fluid lighter than the well bore fluid can reduce the drag making it easier to overcome the friction and run the casing to the desired final depth.

BRIEF DESCRIPTION OF THE DRAWINGS

FIG. 5 is a cross-sectional view of the embodiment of FIG. 4 after the rupture disk has ruptured.

FIG. 6 is a cross-sectional view of an additional embodiment of a buoyancy assist tool in a first position.

DESCRIPTION

The following description and directional terms such as above, below, upper, lower, uphole, downhole, etc., are used for convenience in referring to the accompanying drawings. One who is skilled in the art will recognize that such directional language refers to locations in the well, either closer or farther from the wellhead and the various embodiments of the inventions described and disclosed here may be utilized in various orientations such as inclined, deviated, horizontal and vertical.

Figure 1:
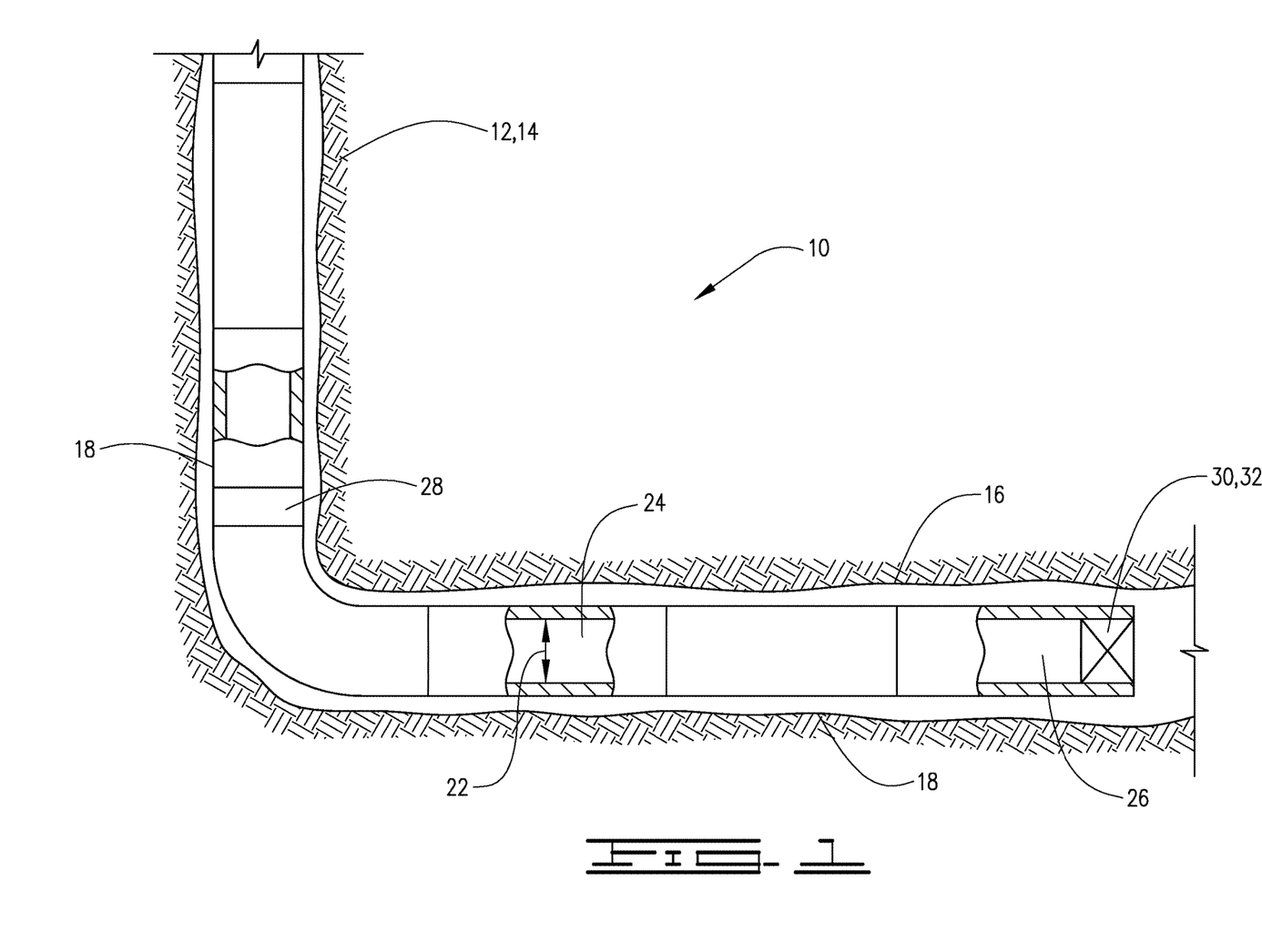
FIG. 1 is a schematic cross-section view of an exemplary well bore with a well casing including a buoyancy chamber therein.

Referring to the drawings, a downhole apparatus 10 is positioned in a well bore 12. Well bore 12 includes a vertical portion 14 and a deviated or horizontal portion 16. Apparatus 10 comprises a casing string 18 which is made up of a plurality of casing joints 20. Casing joints 20 may have inner diameter or bore 22 which defines a central flow path 24 therethrough. Well casing 18 defines a buoyancy chamber 26 with upper end or boundary 28 and lower end or boundary 30. Buoyancy chamber 26 will be filled with a buoyant fluid which may be a gas such as nitrogen, carbon dioxide, or air but other gases may also be suitable. The buoyant fluid may also be a liquid such as water or diesel fuel or other like liquid. The important aspect is that the buoyant fluid has a lower specific gravity than the well fluid in the well bore 12 in which casing 18 is run. The choice of gas or liquid, and which one of these are used is a factor of the well conditions and the amount of buoyancy desired.

Lower boundary 30 may comprise a float device such as a float shoe or float collar. As is known, such float devices will generally allow fluid flow downwardly therethrough but will prevent flow upwardly into the casing. The float devices are generally a one-way check valve. The float device 30 will be configured such that it will hold the buoyant fluid in the buoyancy chamber 26 until additional pressure is applied after the release of the buoyancy fluid from the buoyancy chamber. The upper boundary 28 is defined by a buoyancy assist tool as described herein.

Figure 2:
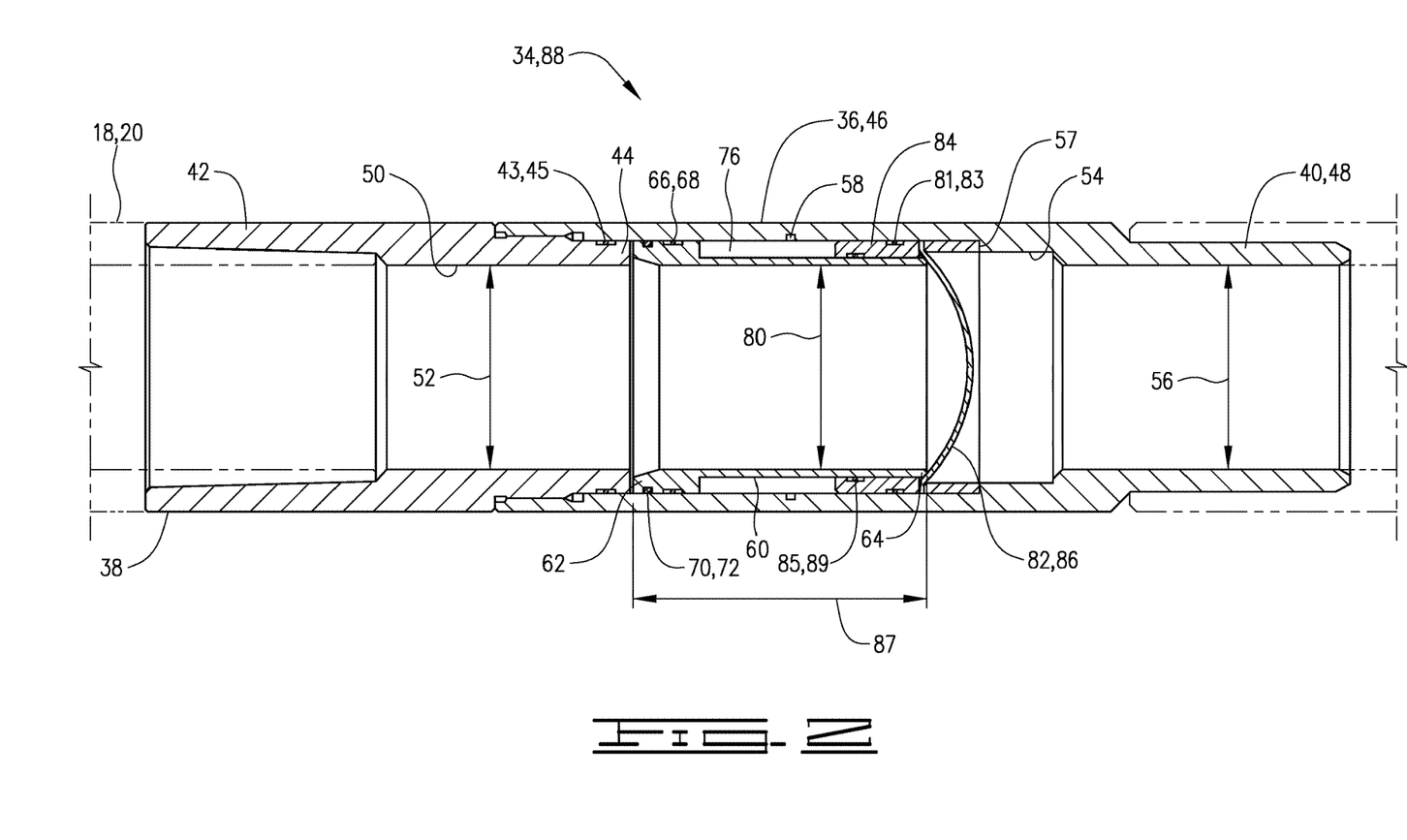
FIG. 2 is a cross section of a buoyancy assist tool of the current disclosure in a first position.

Buoyancy assist tool 34 includes an outer case 36 with upper end 38 and lower end 40. Case 36 defines central opening 39 therethrough, and has longitudinal central axis 41. Upper and lower ends 38 and 40, respectively, are configured to be connected in well casing 18 and in particular to casing joints 20. Outer case 36 comprises an upper outer case 42 having a lower end 44 and a lower outer case 46 having a lower end 48. Upper outer case 42 is connected to lower outer case 46 by threading or other means known in the art.

Upper outer case 42 has inner surface 50 that defines a diameter 52. Diameter 52 in many embodiments is generally the same as the casing diameter inner diameter 22. Lower outer case 46 has inner surface 54 that defines a diameter 56 that is the smallest inner diameter of outer case 36. Inner diameter 56 may be generally the same as or almost the same as that of diameter 22 of casing 18. An upward facing shoulder 57 is defined on inner surface 54. Upper outer case 42 may have a groove 43 with an O-ring seal 45 therein for sealingly engaging against the lower outer case 46.

Lower outer case 46 has a groove 58 defined therein. Sleeve 60 which is movable in outer case 36 is received in outer case 36 and in the embodiment described is received in the lower outer case 46. Sleeve 60 has upper end 62 and lower end 64. Sleeve 60 sealingly engages outer case 36 and in the embodiment shown is sealingly engaged with lower outer case 46. An O-ring or other seal 68 may be received in a groove 66 in sleeve 62 to sealingly engage the outer case 60.

A snap ring 70 is positioned in the groove 72 in the outer surface 74 of sleeve 60. Snap ring 70 in the position shown in FIG. 2, which is the first position, is prevented from expanding and is held in place by the inner surface of lower outer case 46. An annular chamber 76 is defined by and between sleeve 60 and outer case 36 and more specifically by lower outer case 46. Sleeve 60 has inner surface 78 with a diameter 80 which is generally the same as inner diameter 22 of casing 18. Annular chamber 76 is a chamber configured to be at a pressure lower than the pressure downhole in the environment in which the buoyancy assist tool 34 will be used. For example, annular chamber 76 may be an air chamber at atmospheric pressure.

Buoyancy assist tool 34 includes a rupture disk 82 comprising a rupture disk body 84 and rupture disk membrane 86. Rupture disk 82 may abut upward facing shoulder 57. Buoyancy assist tool 34 is shown in a first position 88 in FIG. 2 and in a second position 90 in FIG. 3. As depicted in the figures, sleeve 60 in the first position of the buoyancy assist tool 34 is captured between the upper outer case 42 and rupture disk 82. Sleeve 60 is captured and is prevented from moving upwardly out of the space 87 defined by and between the lower end of upper outer case 42 and rupture disk 82 and more specifically rupture disk membrane 86. Rupture disk membrane 86 will prevent downward movement of sleeve 60 out of the space 87 and upper outer case 42 will prevent upward movement of sleeve 60. Rupture disk body 84 has groove 81 with a seal 83 therein for sealingly engaging outer case 42, and has groove 85 with seal 89 therein for sealingly engaging sleeve 60.

In operation casing string 18 is lowered into wellbore 12 to a desired location. Running a casing such as casing 18 in deviated wells and long horizontal wells often results in significantly increased drag forces and may cause a casing string to become stuck before reaching the desired location in the wellbore. For example, when the casing produces more drag forces than the available weight to slide the casing down the well, the casing may become stuck. If too much force is applied to the casing string 18 damage may occur. The buoyancy assist tool 34 as described herein alleviates some of the issues and at the same time provides for a full bore passageway so that other tools or objects such as, for example production packers, perforating guns and service tools may pass therethrough without obstruction after well casing 18 has reached the desired depth. When well casing 18 is lowered into wellbore 12 buoyancy chamber 26 will aid in the proper placement since it will reduce friction as the casing 18 is lowered into horizontal portion 16 to the desired location.

Once the casing 18 has reached the desired position in the wellbore, pressure is increased to burst rupture disk 82 and more specifically to rupture the rupture disk membrane 86. Prior to the rupture disk membrane being ruptured, sleeve 60 is held in place between the lower end 44 of upper outer case 42 and the rupture disk membrane 86. The lower end 64 of sleeve 60 may engage the rupture disk membrane 86 prior to the time it is ruptured by pressure in the well casing 18.

Figure 3:
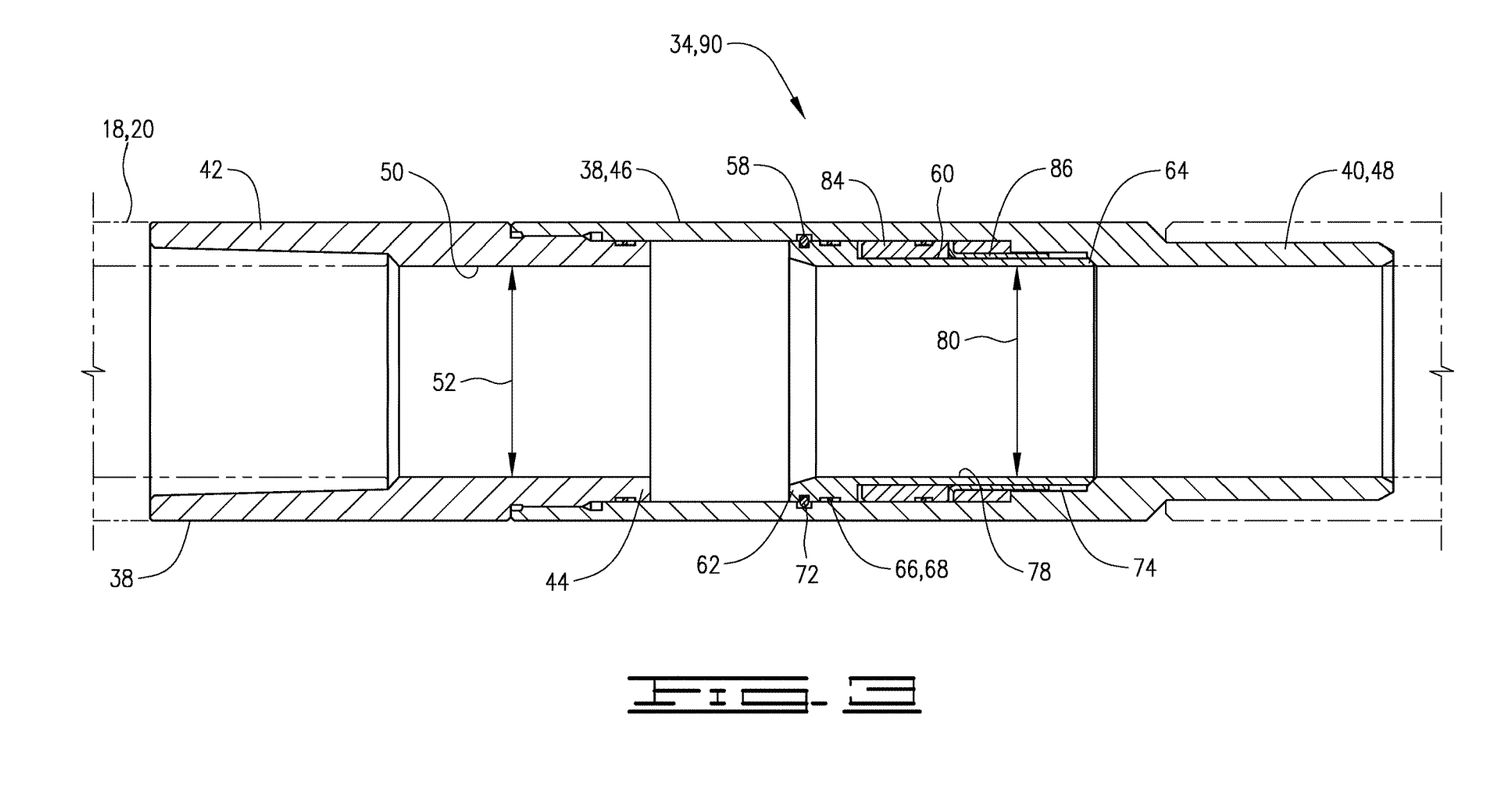
FIG. 3 is a cross section of a buoyancy assist tool of FIG. 2 after the rupture disk has been ruptured.

The pressure is increased in the well casing 18 so that rupture disk membrane 86 will rupture. Upon rupturing of rupture disk membrane 86, fluid pressure acting on sleeve 60 will urge sleeve 60 downwardly so that sleeve 60 is moved from the first to the second position. Sleeve 60 will press the ruptured rupture disk membrane 86 radially outwardly. Sleeve 76 will move downwardly through at least a portion of annular chamber 76, since as described above the pressure therein is less than the pressure acting on sleeve 60. When sleeve 60 reaches the second position as shown in FIG. 3, the rupture disk membrane 86 will be trapped between outer case 36 and sleeve 60 and specifically between lower outer case 46 and sleeve 60. Thus, the sleeve 60 will push the ruptured rupture disk membrane 86 out of the way and clear the buoyancy assist tool for the passage of well tools therethrough. The snap ring 72 will snap outwardly into groove 58 and will also maintain engagement with groove 70 in sleeve 60. As a result, snap ring 72 will prevent sleeve 60 from moving in the outer case 36.

Because the inner diameters 52, 80 and 56 of the upper outer case 42, sleeve 60 and lower outer case 42, respectively, may generally be the same as the inner diameter of the casing 18, the buoyancy assist tool 34 provides for an open bore sufficiently sized to allow the passage of tools therethrough without restricting the size of tools that could otherwise pass through casing 18. In other words, buoyancy assist tool 34 provides no size restriction on the tools that can be passed therethrough that does not already exist due to the size of the inner diameter of casing 18.

Figure 4:
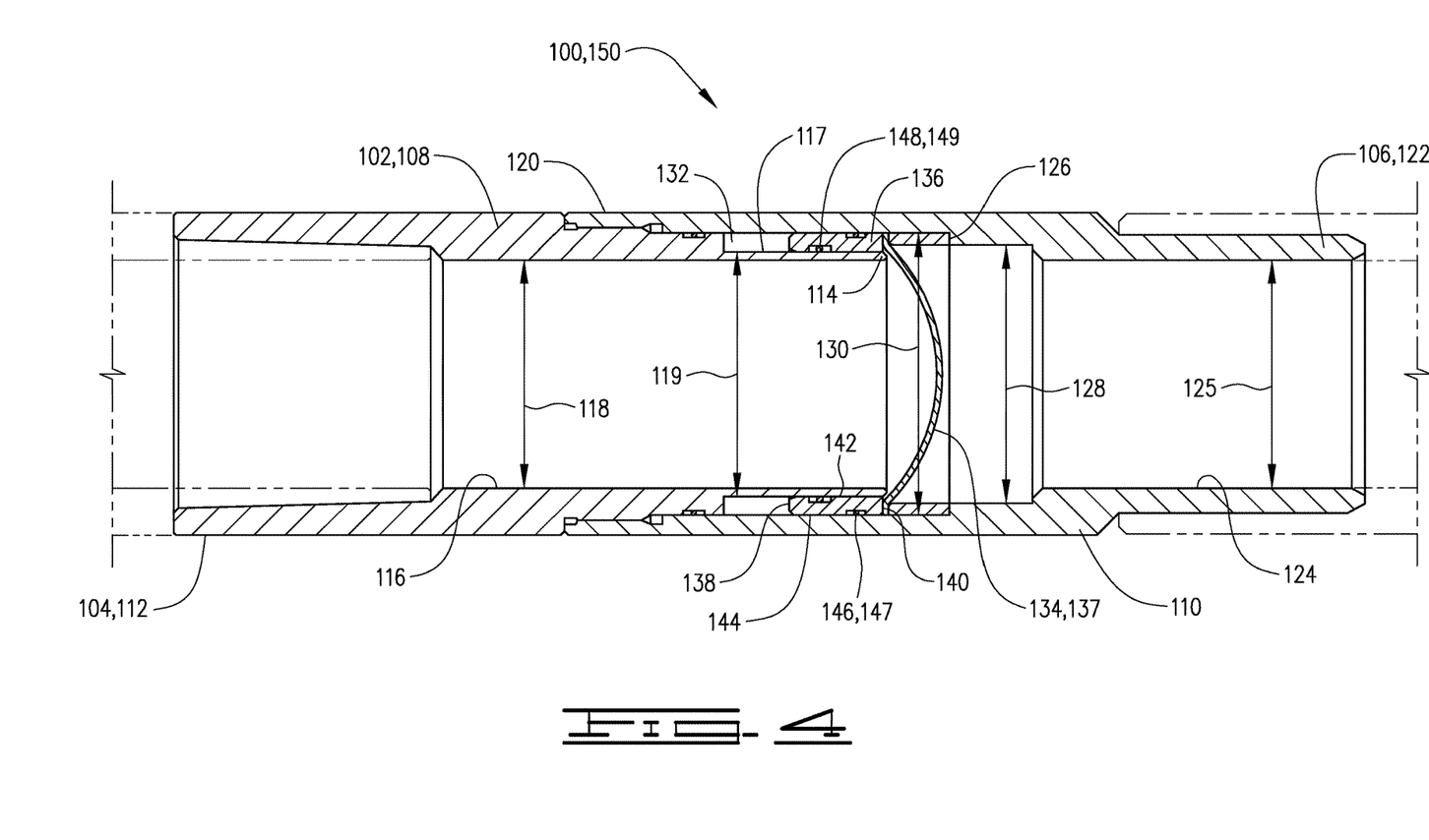
FIG. 4 is a cross section of an additional embodiment of a buoyancy assist tool in a first position.

An additional embodiment of a buoyancy assist tool 100 is shown in FIGS. 4 and 5. Buoyancy assist tool 100 includes an outer case 102 with an upper end 104 and lower end 106. Outer case 102 comprises an upper outer case 108 connected to a lower outer case 110. Upper outer case 108 includes upper end 112, lower end 114, inner surface 116 and outer surface 117. Inner surface 116 defines an inner diameter 118. Inner diameter 118 will be generally the same as the inner diameter 22 of well casing 18. Upper outer case 108 has a reduced outer diameter portion 119.

Lower outer case 110 has upper end 120, lower end 122 and inner surface 124. A minimum outer diameter 125 is defined by inner surface 124. A shoulder, which is an upward facing shoulder 126, is defined by a second inner diameter 128 and a third inner diameter 130, both of which are larger than inner diameter 125. An annular chamber 132 is defined by upper outer case 108, and more specifically by a decreased outer diameter portion 119 thereof and the inner surface 124 of lower outer case 110. Annular chamber 132 is a chamber configured to be at a pressure lower than the pressure downhole in the environment in which the buoyancy assist tool 100 will be used. For example, annular chamber 132 may be an air chamber at atmospheric pressure.

A rupture disk 134 comprising a rupture disk body 136 and rupture disk membrane 137 is positioned in outer case 102. Rupture disk body 136 may comprise a sleeve that is movable in annular chamber 132. Rupture disk 134 is movable in outer case 102 and the embodiment described is slidable in annular chamber 132. Rupture disk body 136 has upper end 138 and lower end 140. In the first position of the buoyancy assist tool 110 which is the first position 150 of rupture disk 134 the rupture disk body 136 may engage the upward facing shoulder 125.

Rupture disk body 136 has outer surface 142 and inner surface 144. The rupture disk 134 and specifically rupture disk body 136 is slidable in annular chamber 132 and sealingly engages upper outer case 108 and lower outer case 110. Outer surface 142 of rupture disk body 136 has groove 146 with an O-ring 147 therein to sealingly engage against the inner surface of lower outer case 110. A groove 148 with O-ring 149 therein will sealingly engage against outer surface 117 on reduced diameter portion 119 of upper outer case 108.

Prior to being lowered into a wellbore and prior to the rupture disk membrane 145 being ruptured, the rupture disk is held in place by the lower end 114 of upper outer case 108 and shoulder 126 on lower outer case 110. In operation, a casing 18 with a buoyancy assist tool 100 may be lowered into wellbore 12, as described with respect to the embodiment of FIG. 2.

Once the well casing 18 has reached the desired point in the well, pressure is increased to burst rupture disk 136 and more specifically to rupture the rupture disk membrane 145. Once the rupture disk membrane 137 bursts, continued application of fluid pressure will cause the rupture disk body 136 to move upwardly in annular chamber 132 since as described above the pressure therein is less than the pressure acting on rupture disk body 136. The rupture disk membrane 137 will engage the lower end of the upper outer case 104 and will be trapped between the upper outer case 102 and lower outer case 108. Upon completion of the travel in annular chamber 132, the rupture disk will be positioned such that all portions of the ruptured rupture disk 137 will be pushed out of the way of the central opening of outer case 102. As a result, buoyancy assist tool 110 provides for an open bore or open passage for the passageway of tools therethrough.

The size of the minimum diameters in the outer case, for example, diameter 118 of upper outer case 108 and diameter 125 of lower outer case 110 may generally be the same as the diameter 122 of casing 18 such that the buoyancy assist tool 100 is no more restrictive than the casing itself once the rupture disk has been ruptured and the rupture disk membrane 137 moved out of the way as a result of movement of the rupture disk in annular chamber 132. The buoyancy assist tool thus provides a passage for tools of a size that can be passed through casing 18.

Figure 7:
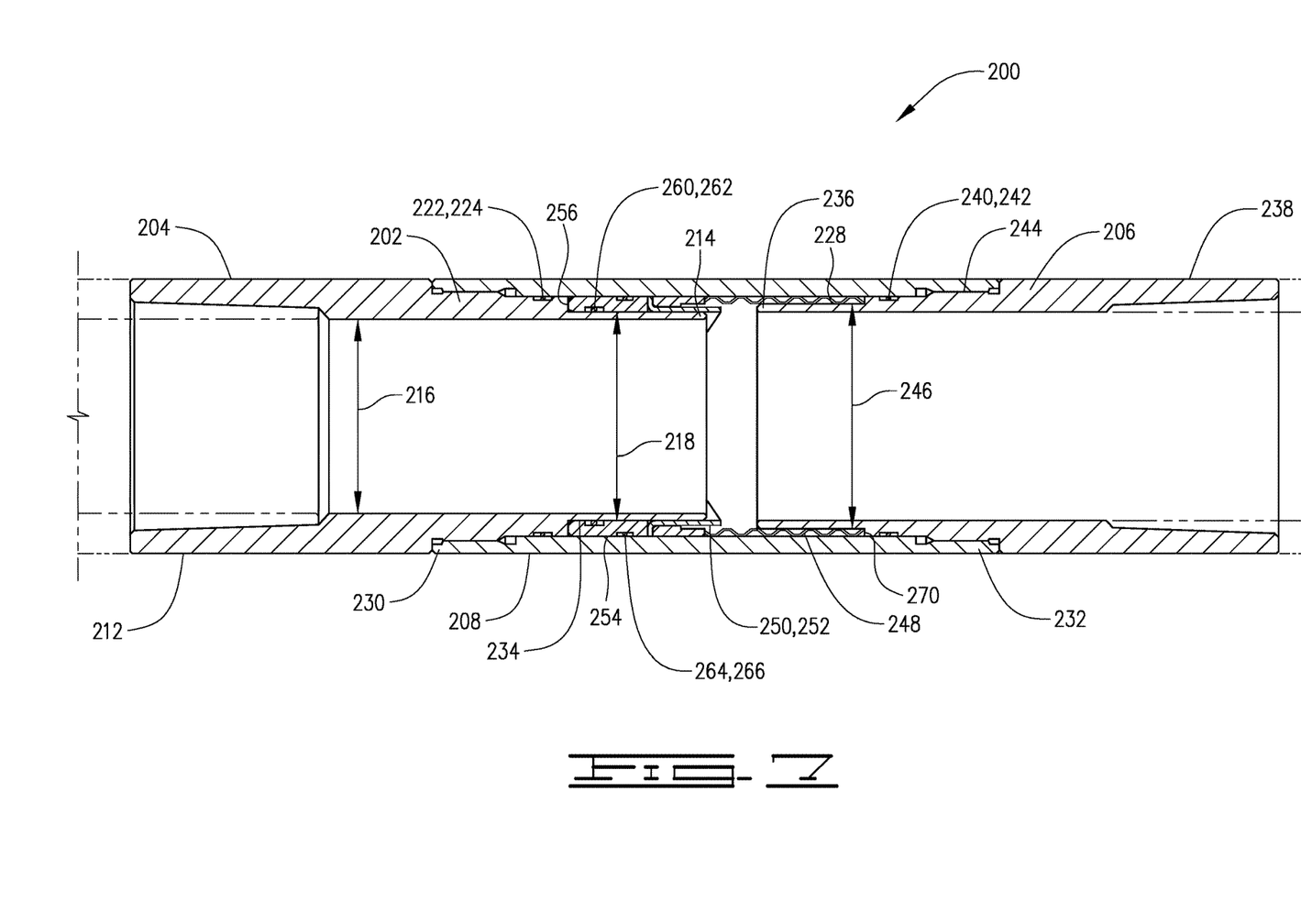
FIG. 7 is a cross-sectional view of the embodiment of FIG. 6 after the rupture disk has ruptured.
Figure 8:
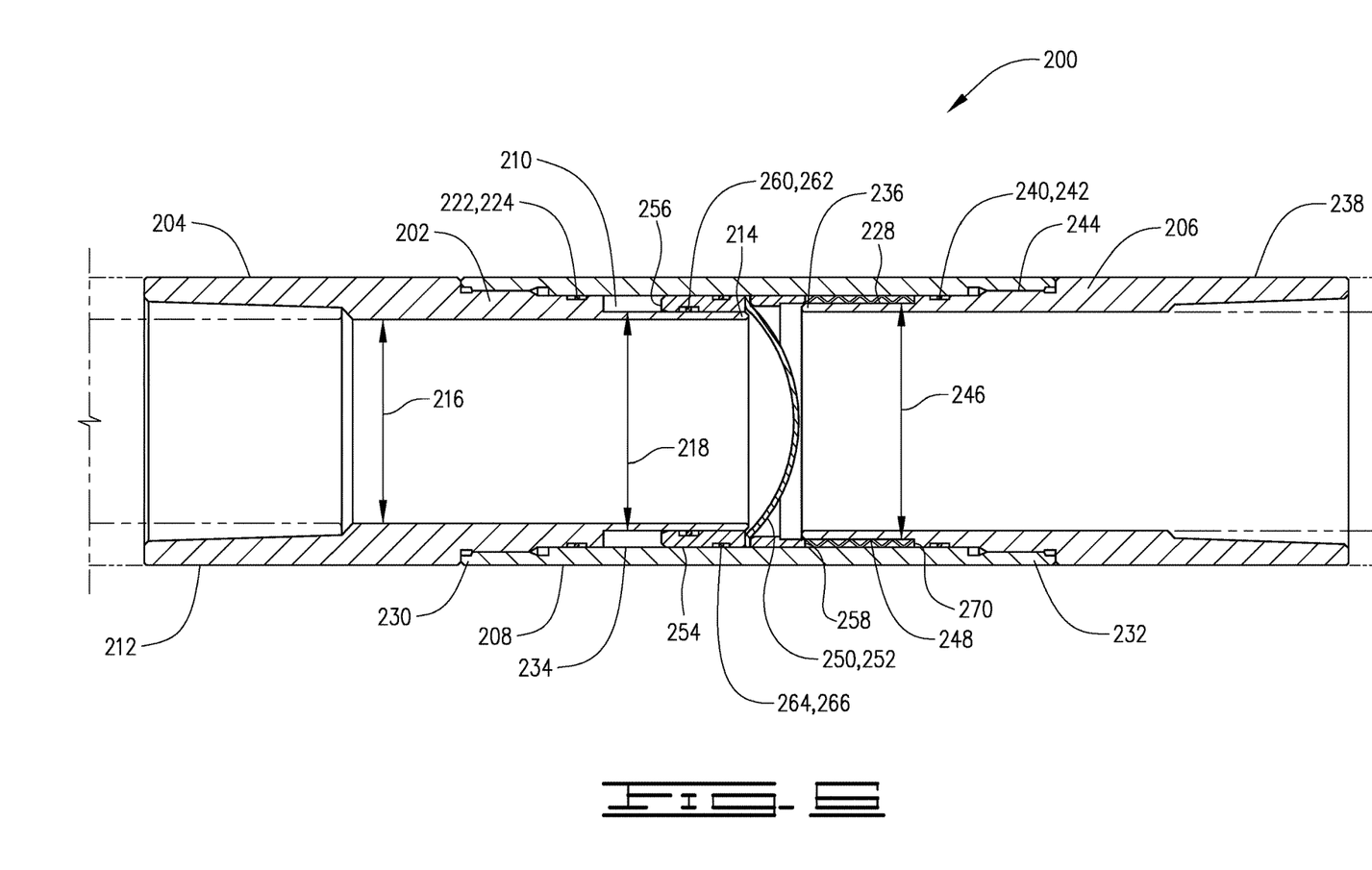
Figure 11:
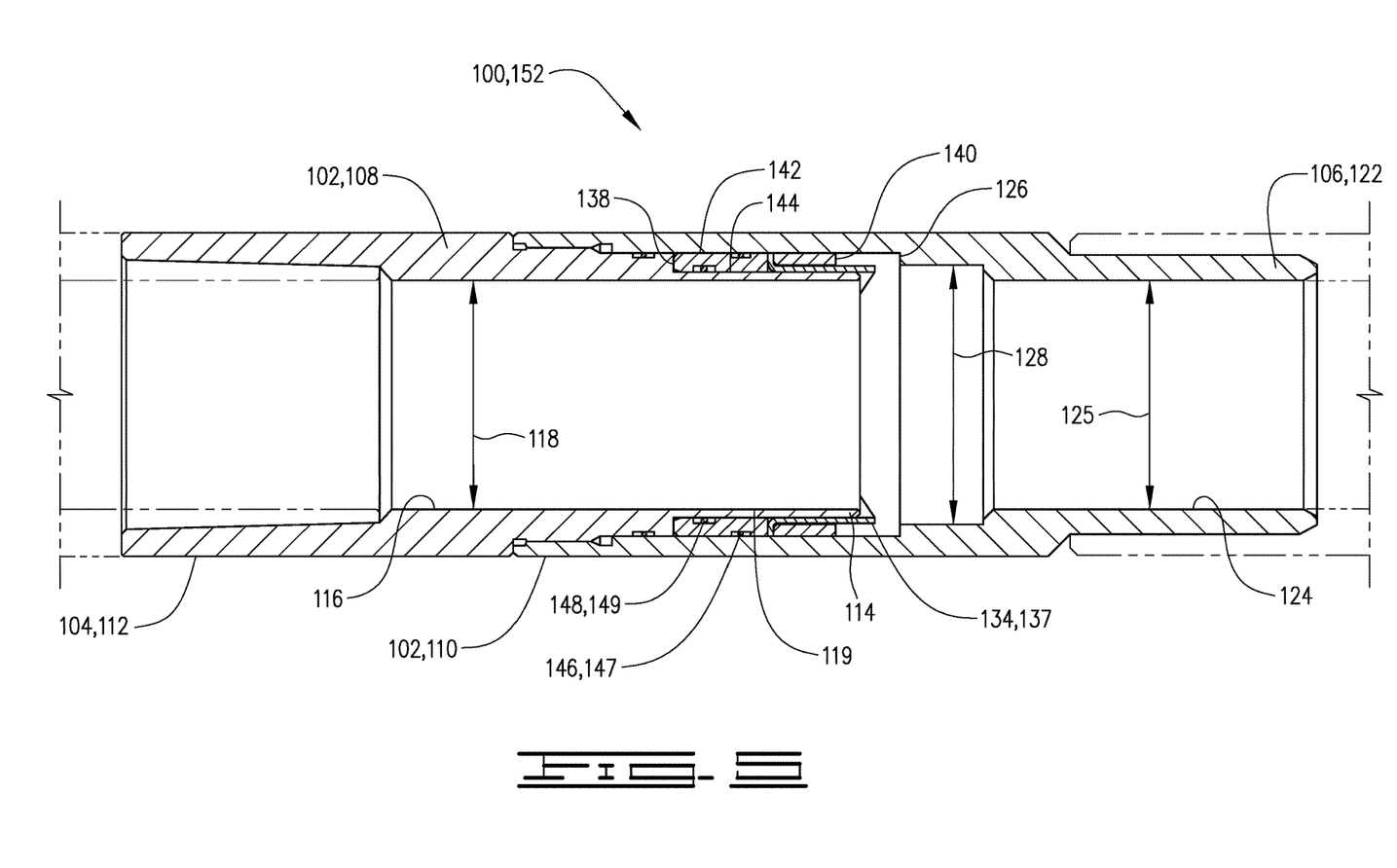

An additional embodiment of the buoyancy assist tool 200 shown in FIG. 6 and FIG. 7 has an outer case 202 comprising upper portion 204, lower portion 206 and a connecting sleeve or connecting housing 208 connected at one end to the upper portion 204 and at the opposite end to the lower portion 206. An annular chamber 210 which may be an annular chamber comprising an air chamber as described above with respect to the previous embodiment is defined by and between the upper portion 204 and connecting sleeve 208.

Upper portion 204 has an upper end 212 configured to connect to casing string 20 and has lower end 214. Upper portion 204 has a reduced outer diameter portion 218. A groove 222 with seal 224 therein will sealingly engage the connecting sleeve 208 above annular chamber 210.

Outer sleeve 208 has upper end 230 connected to upper portion 204 of outer case 202 and lower end 232 connected to the lower portion 206. Outer sleeve 208 has inner surface 234. Lower portion 206 has upper end 236 connected to outer sleeve 208 and has lower end 238 configured to be connected in casing string 20. A groove 240 with seal 242 is disposed in the outer surface of lower portion 206. Seal 242 will sealingly engage the inner surface 244 of outer sleeve 208. Lower portion 206 has a reduced outer diameter portion 246 on outer surface 244. Reduced diameter portion 246 defines an annular space 248 with outer sleeve 208.

A rupture disk 250 includes a rupture disk membrane 252 connected to rupture disk body 254. Rupture disk body 254 may comprise a sleeve that is movable in annular chamber 210. Rupture disk body 254 has upper end 256 and lower end 258. A groove 260 on an inner surface of rupture disk body 254 has a seal 262 therein that sealingly engages the reduced outer diameter portion 218 of the upper portion 204 of outer case 202. The outer surface of rupture disk body 254 has groove 264 with a seal 266 therein for sealingly engaging the inner surface of the outer sleeve 208. The embodiment of FIG. 6 includes a stored energy device which may be for example, compressed gas or a spring 268. A lower end of spring 268 engages a shoulder 270 on lower portion 206 and an upper end 272 thereof engages lower end 258 of rupture disk body 254.

Prior to being lowered into the well bore and prior to rupturing of rupture disk membrane 252 the rupture disk is held in place by the lower end 214 of upper portion 204 of outer case 202 and by spring 268. Lower end 258 of rupture disk body 254 in the position shown in FIG. 6 which is the first position may also engage upper end 236 of lower portion 206.

Once well casing 18 reaches the desired point the well pressure is increased to burst rupture disk membrane 252. Pressure in the well casing will cause the rupture disk body 254 to move upwardly in annular chamber 210 since as described above the pressure therein is less than the pressure acting on rupture disk body 254.

Spring 268 which is a compression spring will aid in urging rupture disk body 254 upwardly in annular chamber 210. The rupture disk membrane 252 will engage lower end 214 of upper portion 204 and will be moved upwardly as rupture disk body 254 moves upwardly. The rupture disk membrane will be positioned between the upper portion 204 and outer or connecting sleeve 208 as shown in FIG. 7 which is the second position.

Upon completion of travel in annular chamber 210 the rupture disk will be positioned such that all portions of rupture disk 250 will be pushed out of the way of the central opening 274 defined through outer case 202. As a result buoyancy assist tool 200 provides for an open bore or open passage the passageway of tools therethrough. In other words, the diameter 276 of central opening 274 will not place a size restriction on tools that may be passed therethrough that does not already exist as a result of the size of the casing to which it is connected.

A buoyancy assist tool comprises an outer case and a rupture disk connected in the outer case. In one embodiment a sleeve is disposed in the outer case and movable from first to second position in the outer case, wherein the sleeve is engaged with a rupture disk membrane of the rupture disk. The rupture disk membrane prevents the sleeve from moving to the second position prior to the rupture disk membrane rupturing. The outer case is configured to be connected in a well casing.

In one embodiment a lock ring is disposed in a groove defined in the sleeve. The lock ring is received in a retaining groove in the outer case in the second position to prevent the sleeve from moving back to the first position. The sleeve traps the rupture disk membrane against the outer case in the second position. In one embodiment the sleeve pushes the rupture disk membrane radially outwardly so that a central opening through the outer case is open and the passage of tools therethough is not impeded. A minimum inner diameter of the outer case may be generally the same as a minimum inner diameter of the casing, and in any event is of a size that will not restrict the size of the tools that can pass therethrough beyond the restrictions that exist as a result of the casing size. In an additional embodiment, the sleeve is moved to the second position exclusively by fluid pressure acting directly on the sleeve.

In another embodiment, a downhole apparatus for use in a well bore comprises a well casing lowered into the wellbore and a sleeve movably disposed in the casing. The sleeve is movable from a first to a second position. A rupture disk is mounted in the casing. The rupture disk engages the sleeve to prevent the sleeve from moving downward in the casing prior to the application of a predetermined fluid pressure in the casing.

The sleeve moves from a first to a second position in the casing after the rupture disk membrane of the rupture disk bursts upon the application of a predetermined pressure thereto. The motive force to move the sleeve from the first to the second position is provided exclusively by fluid flowing through the casing. In one embodiment a lower end of the sleeve engages the rupture disk in the first position of the sleeve and the sleeve traps the rupture disk membrane against the casing in the second position. The sleeve moves the ruptured rupture disk membrane radially outwardly as it moves to the second position.

In an additional embodiment a buoyancy assist tool comprises an outer case. The outer case comprises an upper outer case and a lower outer case connected to the upper outer case. The upper and lower outer cases are configured to be connected in a casing string. An annular chamber is defined by and between the upper case and lower case.

In one embodiment a rupture disk comprising a rupture disk body and a rupture disk membrane is mounted in the outer case and the rupture disk body is movable axially in the annular chamber. Fluid pressure in the outer case urges the rupture disk body upwardly in the annular chamber. The rupture disk body sealingly engages both the upper and lower outer cases. The rupture disk membrane is positioned in the annular chamber between the upper case and the outer case in the second position thereof. The upper and lower outer cases define an open bore for the passage of tools therethrough. In one embodiment the upper and lower outer cases have minimum inner diameters substantially equal to the inner diameter of the well casing above the outer case.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention.

What is claimed is:

1. A buoyancy assist tool comprising:
an outer case;
a rupture disk comprising a rupture disk body and a rupture disk membrane connected in the outer case; and
a sleeve disposed in the outer case and movable downwardly from a first to a second position in the outer case, wherein the sleeve is in direct contact with the rupture disk membrane of the rupture disk, and wherein the rupture disk membrane prevents the sleeve from moving downwardly to the second position prior to the rupture disk membrane rupturing.

2. The buoyancy assist tool of claim 1, further comprising a lock ring disposed in a groove defined in the sleeve, wherein the lock ring is received in a retaining groove in the outer case in the second position to prevent the sleeve from moving back to the first position.

3. The buoyancy assist tool of claim 2, wherein the sleeve is moved to the second position solely as a result of fluid pressure acting directly on the sleeve.

4. The buoyancy assist tool of claim 1 wherein the sleeve traps the rupture disk membrane in the second position.

5. The buoyancy assist tool of claim 1 connected in a well casing and configured to be lowered into a well bore.

6. A downhole apparatus for use in a well bore comprising:
a well casing lowered into the wellbore;
a sleeve movably disposed in the casing and movable from a first to a second position therein; and
a rupture disk comprising a rupture disk body and a rupture disk membrane mounted in the casing, wherein the rupture disk directly contacts the sleeve to prevent the sleeve from moving downwardly in the casing prior to the application of a predetermined fluid pressure in the casing to rupture the rupture disk, wherein the sleeve moves from the first to the second position in the casing as the rupture disk membrane of the rupture disk bursts, and wherein a lower end of the sleeve engages the rupture disk membrane in the first position of the sleeve.

7. The downhole apparatus of claim 6, wherein the motive force to move the sleeve from the first to the second position is provided exclusively by fluid flowing through the casing.

8. The downhole apparatus of claim 6 wherein the sleeve traps the rupture disk membrane against the casing in the second position.

9. The downhole apparatus of claim 6, wherein the sleeve moves the ruptured rupture disk membrane radially outwardly as it moves to the second position.

10. A buoyancy assist tool comprising:
an outer case defining a central flow passage therethrough, the outer case comprising an upper outer case and a lower outer case connected to the upper outer case, the upper and lower outer cases configured to be connected in a casing string;
an annular chamber defined by and between the upper case and lower case;
a movable sleeve disposed in the outer case and movable downwardly from a first to a second position in the outer case; and
a rupture disk comprising a rupture disk body and a rupture disk membrane connected thereto, the movable sleeve being in direct contact with the rupture disk membrane in the first position of the movable sleeve, wherein the rupture disk membrane is positioned in the central flow passage and blocks flow therethrough in the first position of the movable sleeve and is moved out of the central flow passage and is trapped between the movable sleeve and the outer case in the second position of the movable sleeve.

11. The buoyancy assist tool of claim 10 wherein fluid pressure applied in the outer case will burst the rupture disk membrane, and wherein the sleeve moves downwardly in the outer case after the rupture disk membrane bursts.

12. The buoyancy assist tool of claim 10, wherein the rupture disk membrane prevents the sleeve from moving until a pressure sufficient to burst the rupture disk membrane is applied.

13. The buoyancy assist tool of claim 10 connected in a well casing in a well bore.

14. The buoyancy assist tool of claim 13, the upper and lower outer cases defining an open bore for the passage of tools therethrough in the second position of the sleeve.

15. The buoyancy assist tool of claim 13, the upper and lower outer cases having minimum inner diameters substantially equal to the inner diameter of the well casing above the outer case.

* * * * *